Oct. 1, 1935

J. BITTNER 2,015,704

BRAKE

Filed March 21, 1931

INVENTOR.
JOHN BITTNER
BY
ATTORNEY

Patented Oct. 1, 1935

2,015,704

UNITED STATES PATENT OFFICE 2,015,704

BRAKE

John Bittner, South Bend, Ind., assignor to Bendix Brake Company, South Bend, Ind., a corporation of Illinois Application March 21, 1931, Serial No. 524,276

11 Claims. (Cl. 188—78)

This invention relates to brakes, and is illustrated as embodied in an internal expanding automobile brake of the type having a pair of anchored shoes. An object of the invention is to provide an extremely simple and powerful brake, preferably of the described type, and which preferably has a substantial self-energizing action in the shoes without the multiplied servo effect of one shoe acting on another.

One feature of the invention relates to the anchorage, which is arranged in a novel manner to allow the anchored ends of the shoes to float or shift radially to bring them into effective engagement with the drum, for example by engaging them with a pair of oppositely-extending links mounted on an anchor post or the like, which preferably is mounted in the backing plate in a manner permitting it to be adjusted radially of the plate. I prefer that the links extend in such directions that the braking torque is transmitted to and through them in tension, permitting the shoes to overlap each other at their anchored ends, thereby giving them a greater effective length. A return spring may be tensioned between the links.

Another feature relates to a novel floating applying means, which can shift radially with the unanchored ends of the shoes to permit the above-described movements at the anchorage, and which preferably comprises a lever pivoted directly to the unanchored ends of the shoes (which may overlap each other to permit a radial arrangement of the lever). The lever may conveniently be operated by a cable or other tension connection passing through the backing plate.

Figure 1:
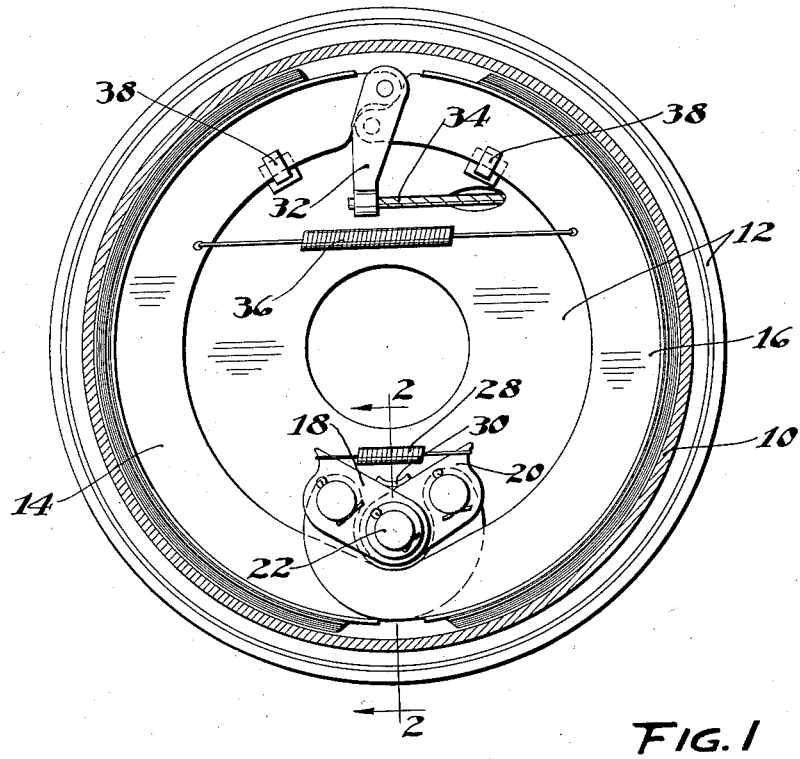
Figure 2:
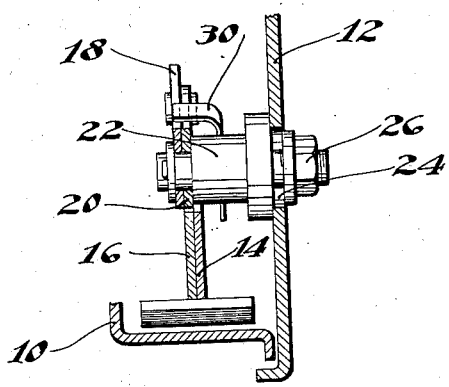

The above and other objects and features of the invention, including various novel and desirable particular combinations and constructions of the various parts of the brake, will be apparent from the following description of the specific embodiment shown in the accompanying drawing, in which:

Figure 1 is a section through the brake, just inside the head of the brake drum, and showing the brake shoes in side elevation; and Figure 2 is a partial radial section through the brake anchorage.

The brake selected for illustration includes the usual rotatable drum 10, at the open side of which is a backing plate or equivalent support 12, and within which is arranged the friction means of the brake, the drum and the backing plate in effect forming a brake chamber or housing for the friction means.

The friction means preferably includes a pair of novel and substantially semi-circular brake shoes 14 and 16, faced with any usual brake lining or the like. As best appears in Figure 2, the webs of the shoes at their anchored ends are offset widthwise of the shoes, and overlap each other to form inturned portions pivotally engaging oppositely-extending tension anchor links 18 and 20.

Links 18 and 20 form part of a novel brake anchorage, and are pivotally mounted on a normally fixed anchor post 22, preferably mounted at its other end in a radial slot 24, so that it may be adjusted radially of the drum and clamped firmly in any desired adjusted position, for example by tightening a nut or the like 26. A return spring 28 may be tensioned between the links, urging them pivotally toward each other to shift the lower ends of the shoes radially inward away from the drum. If desired, a suitable stop 30 may be mounted on post 22 (preferably frictionally pivoted thereon), to be engaged by links 18 and 20 when the brake is released and thereby determine their released positions.

The upper ends of the shoes are provided with a novel floating applying device which permits the described shoe movements, and which preferably consists of a radial lever 32 pivoted directly to and supported by the upper overlapping ends of the shoe webs, and shown as operated by a cable or the like flexible tension element 34 extending through the backing plate. A second return spring 36 tensioned between the shoes urges their upper ends inwardly toward released positions determined by suitable stops 38.

While one illustrative embodiment has been described in detail, it is not my invention to limit the scope of the invention to that particular embodiment, or otherwise than by the terms of the appended claims.

I claim:

1. A brake having a fixed anchorage, a pair of shoes overlapping each other at their ends and with their overlapping ends projecting past the anchorage, tension links connecting said ends to the anchorage and freely pivoted on said anchorage, and a spring tensioned between said links and urging them toward released position.

2. A brake having a fixed anchorage, a pair of substantially semi-circular shoes with their ends projecting past the anchorage, tension links connecting said ends to the anchorage, and freely pivoted on said anchorage, means urging said links toward released position, and applying means acting directly on the ends of the shoes opposite the anchorage.

3. A brake comprising a backing plate having a normally fixed anchor which is adjustable radially of the plate, a pair of links extending in opposite directions and pivoted on the anchor, a pair of shoes each pivoted to the link on the opposite side of the anchor, and a return spring tensioned between the links and urging them in a direction to move the anchored ends of the shoes toward released positions and which spring is overcome by the shoes in applying the brake.

4. A brake comprising a backing plate having an anchor, a pair of links extending in opposite directions from the anchor, a pair of shoes each extending past the anchor and connected to the link on the opposite side of the anchor, and a return spring tensioned between the links and urging them in a direction to move the anchored ends of the shoes toward released positions and which spring is overcome by the shoes in applying the brake.

5. A brake comprising a backing plate having an anchor, a pair of links extending in opposite directions from the anchor, a pair of shoes each extending past the anchor and connected to the link on the opposite side of the anchor, and a return spring tensioned between the links.

6. A brake comprising a backing plate having an anchor, a pair of links extending in opposite directions from the anchor, a pair of shoes each extending past the anchor and connected to the link on the opposite side of the anchor, a return spring tensioned between the links and urging the anchored ends of the shoes toward their released positions, and another return spring tensioned between the shoes and urging their unanchored ends toward their released positions.

7. A brake comprising a drum and a pair of shoes, an anchorage for the shoes permitting their anchored ends to move radially toward the drum in applying the brake and away from the drum in releasing the brake while the unanchored ends have a corresponding radial movement, and floating applying means including a lever pivoted to and carried by the unanchored ends and permitting said radial movements thereof.

8. A brake shoe having its anchored end turned radially inward and having an anchor link connected to said inturned end.

9. An anchor post having anchor links pivoted thereon, and having a stop for said links frictionally pivoted thereon.

10. An anchor post having diverging anchor links pivoted thereon, and having a stop in the angle between and engageable by both of said links.

11. An anchor post having a stop frictionally pivoted thereon and also having separately mounted thereon a brake shoe connection.

JOHN BITTNER.